United States Patent
Feola

(10) Patent No.: US 10,011,678 B2
(45) Date of Patent: Jul. 3, 2018

(54) CATIONIC ALKYD RESINS

(71) Applicant: Allnex Austria GmbH, Werndorf (AT)

(72) Inventor: Roland Feola, Graz (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 0 days.

(21) Appl. No.: 15/034,207

(22) PCT Filed: Oct. 21, 2014

(86) PCT No.: PCT/EP2014/072540
§ 371 (c)(1),
(2) Date: May 4, 2016

(87) PCT Pub. No.: WO2015/067463
PCT Pub. Date: May 14, 2015

(65) Prior Publication Data
US 2016/0280843 A1    Sep. 29, 2016

(30) Foreign Application Priority Data

Nov. 7, 2013 (EP) ..................................... 13192037

(51) Int. Cl.
| | | |
|---|---|---|
| *C08G 59/50* | (2006.01) | |
| *C08G 59/18* | (2006.01) | |
| *C08G 59/16* | (2006.01) | |
| *C09D 5/00* | (2006.01) | |
| *C09D 163/10* | (2006.01) | |
| *B05D 1/02* | (2006.01) | |
| *B05D 1/18* | (2006.01) | |
| *B05D 1/28* | (2006.01) | |

(52) U.S. Cl.
CPC ....... *C08G 59/184* (2013.01); *C08G 59/1472* (2013.01); *C09D 5/002* (2013.01); *C09D 163/10* (2013.01); *B05D 1/02* (2013.01); *B05D 1/18* (2013.01); *B05D 1/28* (2013.01)

(58) Field of Classification Search
CPC .. C08G 59/1472; C08G 59/184; C09D 5/002; C09D 163/10; B05D 1/02; B05D 1/18; B05D 1/28
USPC ....................................................... 523/400
See application file for complete search history.

(56) References Cited

U.S. PATENT DOCUMENTS

| | | | |
|---|---|---|---|
| 3,900,437 A * | 8/1975 | Preston .................. | C08G 69/00 525/524 |
| 4,358,551 A | 11/1982 | Shimp | |
| 4,698,396 A | 10/1987 | Drawert et al. | |
| 5,089,342 A | 2/1992 | Dhein et al. | |
| 5,391,649 A | 2/1995 | Holmberg | |
| 5,589,535 A | 12/1996 | Schwab et al. | |
| 6,673,877 B2 | 1/2004 | Paar et al. | |
| 8,445,585 B2 | 5/2013 | Paar et al. | |
| 2002/0115736 A1* | 8/2002 | Koshy ........................ | C08J 9/32 521/99 |
| 2010/0092733 A1* | 4/2010 | Blank ..................... | B29C 65/54 428/174 |
| 2012/0142816 A1* | 6/2012 | Argyropoulos .... | C08G 59/5006 523/400 |

FOREIGN PATENT DOCUMENTS

| | | | |
|---|---|---|---|
| AT | 390 261 | 4/1990 | |
| CN | 101205489 A * | 6/2008 | ............. C10L 1/224 |
| EP | 0 267 562 | 11/1987 | |
| EP | 0 312 733 | 8/1988 | |
| EP | 0 355 761 | 8/1988 | |
| EP | 0 316 732 | 11/1988 | |
| EP | 0 741 156 | 11/1996 | |
| EP | 2275488 A1 * | 1/2011 | ......... B29C 45/0001 |
| EP | 2 319 877 | 5/2011 | |

OTHER PUBLICATIONS

Hu et al., CN 101205489 A machine translation in English, Jun. 25, 2008.*
International Search Report dated Jan. 20, 2015 in International Application No. PCT/EP2014/072540.

* cited by examiner

*Primary Examiner* — David T Karst
(74) *Attorney, Agent, or Firm* — Wenderoth, Lind & Ponack, L.L.P.

(57) ABSTRACT

The invention relates to a binder resin which is a plastified epoxide-amine adduct P comprising an adduct EA made of epoxide resins E and amines A, optionally modified by incorporation of unsaturated fatty acids F', which adduct is plastified by incorporation of a fatty acid amide M, or a mixture M' of the said fatty acid amide M with a glyceride mixture GX which is a mixture of at least two glycerides selected from the group consisting of a triglyceride GT, a diglyceride GD, and a monoglyceride GM, to a process for its preparation, and to a method of use thereof as primer for wood, mineral, and metal substrates.

17 Claims, No Drawings

CATIONIC ALKYD RESINS

FIELD OF THE INVENTION

The invention relates to cationic aqueous binders for corrosion protection systems which are oxidatively crosslinkable by reaction of atmospheric oxygen with olefinic double bonds comprised in the binder molecules, which crosslinking is also referred to as "air-drying".

BACKGROUND OF THE INVENTION

Air drying resins or binders are known primarily in the field of alkyd resins; water dilutable alkyd resins are obtained by mixing (unmodified) alkyd resins with emulsifiers or by incorporation of a sufficient number of acid groups into the polyester molecule which remain following the condensation reaction, and the neutralisation of at least some of said groups, or cocondensation with hydrophilic polyoxyalkylene polyols such as polyethylene glycol. The former systems are anionic, the latter systems are non-ionic in nature.

By way of example, hydroxy functional emulsifiers for alkyd resins based on polyurethane polyureas have been known from EP 0 741 156 A1. Other externally emulsified aqueous alkyd resin compositions have been described in EP 0 593 487 A1. Alkyd resins with chemically incorporated emulsifier which are self-emulsifying have been known from EP 0 312 733 A2.

Water compatibility is achieved in all cases by the use of nonionic or anionic emulsifiers, in chemically incorporated or added form.

It is also known to modify polyurethane resins by incorporating unsaturated fatty acids (EP 0 444 454 A2) so that paints produced with them are air drying.

Epoxy functional resins which, through modification with fatty acids, lead to air drying binders have been described in EP 0 355 761 A2 (esters of fatty acids with epoxy resins), EP 0 316 732 A2, EP 0 370 299 A1 (acrylate resins with epoxide groups), and EP 0 267 562 A2 (alkyd, urethane-alkyd or epoxide-ester resins grafted in an aqueous medium with olefinically unsaturated monomers).

Aqueous formulations of neutralised reaction products of epoxy resin-amine adducts and fatty acids have been known from EP 0 070 704 A2. There, amines and epoxy resins based on polyhydric phenols are used to prepare adducts having a molar mass of from 1000 g/mol to 3000 g/mol which are then reacted with unsaturated fatty acids to give a product in which the mass fraction of these fatty acids is from 25% to 50%. The amount of fatty acids is to be chosen so that all of the active amine hydrogen atoms are consumed.

In AT 390 261 B, emulsions of epoxy resin esters are disclosed which can be used as binders for air drying paints. The resins are prepared by reacting epoxy resins which are partially esterified with fatty acids, and copolymers of unsaturated fatty acids and (meth)acrylic acid, and further, copolymerisable monomers. The reaction products are at least partly neutralized using alkaline compounds to achieve water dilutability. These resins may also be admixed to amino functional epoxy resin esters.

Reaction products of reaction of epoxy resins, fatty acids, and amines have been known from EP 1 233 034 A1, and primers made therewith show good anti-corrosion properties. However, protective coatings made from such primers fail under extended exposure to corrosive environments, and their hardness is not sufficient.

SUMMARY OF THE INVENTION

It has now been found in the course of experiments made to improve these properties that reaction products of epoxide resins and amines, optionally modified by incorporation of unsaturated fatty acids, which reaction products are modified by incorporation of fatty acid amides, may be used as binders for air drying paints which afford excellent corrosion protection particularly to metallic substrates over prolonged exposure times, and have good hardness.

An object of the invention is therefore a binder resin which is a plastified epoxide-amine adduct P comprising an adduct EA made of epoxide resins E and amines A, optionally modified by incorporation of unsaturated fatty acids F', which adduct is plastified by incorporation of a fatty acid amide M, or a mixture of the said fatty acid amide M with a glyceride mixture GX which is a mixture of at least two glycerides selected from the group consisting of a triglyceride GT, a diglyceride GD, and a monoglyceride GM.

A further object of the invention is a mixture M' comprising a fatty acid amide M and a glyceride mixture GX which is a mixture of at least two glycerides selected from the group consisting of triglyceride GT, a diglyceride GD and a monoglyceride GM, which is useful as intermediate for the air-drying cationic alkyd resins according to this invention. In this mixture GX, the sum of the amount of substance n(OH,GD) of hydroxyl groups present in the diglyceride GD and the amount of substance n(OH,GM) of hydroxyl groups present in the monoglyceride GM is preferably equal to the amount of substance of fatty acid moieties in the fatty acid amide M.

A further object of the invention is a primer composition particularly for base metals which composition comprises as binder resin a plastified epoxide-amine adduct P comprising an adduct EA made of epoxide resins E and amines A, optionally modified by incorporation of unsaturated fatty acids F', which adduct is plastified by incorporation of a fatty acid amide M, or a mixture M' of the said fatty acid amide M with a glyceride mixture GX which is a mixture of at least two glycerides selected from the group consisting of a triglyceride GT, a diglyceride GD, and a monoglyceride GM.

DETAILED DESCRIPTION OF THE PREFERRED EMBODIMENTS

The fatty acid amide M is made from a fatty acid F, and an amine A' having at least one primary and at least one secondary amino group, by reacting the primary amino groups of the amine A' with the fatty acid F under formation of an amide M=FA'. The mixture of the said fatty acid amide M with a glyceride mixture GX is made by reacting an oil GT which is a triglyceride, and an amine A' having at least one primary and at least one secondary amino group, by reaction of the primary amino groups of the amine A' with the oil GT, under formation of an amide M of the fatty acid F, at least a part of the oil GT having been converted to a diglyceride, GD, or also, a monoglyceride GM, or mixtures of these, optionally also with unreacted oils GT, depending on the stoichiometry. The oil GT is a triglyceride, which is an ester of one molecule of glycerol G and three molecules of fatty acid F wherein the fatty acids may be the same, or may differ from each other, in one molecule, or in the mixture of triglycerides that make up the oil. The latter oils having different fatty acids are, for example, oils based on natural feedstocks such as sunflower oil, tall oil, linseed oil, to name only a few.

In the reaction to make the fatty acid amides M are from an oil GT or a fatty acid F with an amine A' as defined supra, in the case of an oil having three ester bonds between one molecule of glycerol and three molecules of one or more fatty acids, in the first step, one of the ester bonds of the oil is cleaved, and a diglyceride GD which is an ester of one molecule of glycerol and two molecules of the same or different fatty acids, and a fatty acid amide are formed. Depending on the stoichiometry, and also the steric conditions, a second ester bond of the oil may be cleaved in the next step, and a further acid amide and a monoglyceride GM which is an ester of one molecule of glycerol with one molecule of a fatty acid can be formed, It is preferred to keep the amount of amine A' within a limit so that the average reaction product contains diglycerides, and also monoglycerides, the latter preferably in an amount so that the mass fraction of monoglycerides GM in the mixture of fatty acid amides M, unreacted oil GT, diglycerides GD, and monoglycerides GM does not exceed 30%, more preferred, does not exceed 20%, and most preferred, is not more than 15%.

The oils or triglycerides GT are at least partially unsaturated oils having an iodine value, or iodine number, of from 30 cg/g to 200 cg/g, preferably from 40 cg/g to 180 cg/g. Preferred oils have an iodine number of at least 60 cg/g, and are preferably selected from the group consisting of linseed oil, corn oil, castor oil, cottonseed oil, grapeseed oil, kiwi seed oil, perilla oil, poppy seed oil, safflower oil, soybean oil, and sunflower oil. As is well known, oils are esters of glycerol G with fatty acids F or a mixture of fatty acids, also referred to as triglycerides GT as one molecule of glycerol is esterified with three molecules of fatty acids which may be the same, or may be different.

The fatty acids F may be saturated or may have at least one olefinic unsaturation, and therefore comprise unsaturated fatty acids having at least one olefinic unsaturation, and preferably from six to thirty carbon atoms, particularly preferred, from eight to twenty-six carbon atoms, and especially preferred, from sixteen to twenty-two carbon atoms. Among the preferred unsaturated fatty acids are palmitoleic acid, oleic acid, erucic acid, linoleic acid, linolenic acid, eleostearic acid, arachidonic acid, clupanodonic acid, and mixtures of fatty acids made from natural sources such as linseed oil fatty acid, sunflower fatty acid, isomerised sunflower fatty acid, tall oil fatty acid, cotton seed oil fatty acid, rape seed oil fatty acid, and fatty acid mixtures obtained from dehydrated castor oil. The fatty acids F additionally comprise linear or branched saturated fatty acids having from four to thirty carbon atoms, preferably from six to twenty-six, and particularly preferred, from eight to twenty-two carbon atoms. These include butyric acid, caproic acid, caprylic acid, 2-ethyl hexanoic acid, capric acid, lauric acid, myristic acid, palmitic acid, stearic acid, arachidic acid, behenic acid, and lignoceric acid. Mixtures of these, as well as mixtures of unsaturated and saturated fatty acids are also included.

The amines A' have at least two primary amino groups, and at least one secondary amino group, and from four to forty carbon atoms, preferably up to twenty carbon atoms. They are aliphatic, and may be linear, branched or cyclic, with preference linear and cyclic. Amines A' having two or more primary amino groups, and one or more secondary amino groups are preferred. The amines A' are particularly preferably obeying to the formula

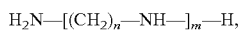

where n is an integer number of from two to twelve, preferably two to six, and m is an integer number of from two to two hundred, preferably from three to ten, and particularly preferably, up to six. Such preferred amines A' are diethylene triamine, triethylene tetramine, tetraethylene pentamine, pentaethylene hexamine, and oligomeric and polymeric ethylene imines having amino end groups, of formula H$_2$N—[CH$_2$—CH$_2$—NH—]$_{m'-1}$—CH$_2$—CH$_2$—NH$_2$, where m' is from five to two hundred. Further preferred amines are oligomeric 1,2- and 1,3-propylene imines having amino end groups, oligomeric 1,2- and 1,4-butylene imines having amino end groups, and oligomeric 1,6-hexamethylene imines having amino end groups, such as di-(2-methylethylene) triamine, tri-(2-methylethylene) tetramine, tetra-(2-methylethylene) pentamine, dipropylene triamine, tripropylene tetramine, tetrapropylene pentamine, dibutylene triamine, tributylene tetraamine, tetrabutylene pentamine, and di(hexamethylene) triamine, tri(hexamethylene) tetramine, tetra(hexamethylene) pentamine. Further preferred amines include cyclic amines such as N,N'-bis-(2-aminoethyl)-piperazine, and N'-[2-[4-(2-aminoethyl) piperazin-1-yl]-ethyl]-ethane-1,2-di-amine.

The epoxide resins E may be selected from diepoxide or polyepoxide compounds having two or more than two epoxide groups per molecule, which may be obtained in the common way by reaction of epichlorohydrine with aromatic compounds D1 or (cyclo)aliphatic compounds D2 having each two or more hydroxyl groups per molecule (the Taffy process), or by reaction of low molar mass diepoxide or polyepoxide compounds D3 having a molar mass in the range of from 200 g/mol to with the said aromatic or (cyclo)aliphatic compounds having two or more hydroxyl groups per molecule (the advancement reaction). Preferred are diepoxides D3 based on aromatic dihydroxy compounds D1 such as bisphenol A (bisphenol A diglycidyl ether, having a molar mass M=340.4 g/mol), bisphenol F, dihydroxydiphenyl sulphone, hydroquinone, resorcinol (resorcinol diglycidyl ether, M=222.2 g/mol), 1,4-bis-[2-(4-hydroxyphenyl)-2-propyl]benzene, or (cyclo)aliphatic dihydroxy compounds D2 such as hexanediol-1,6, butanediol-1,4 (butane diol diglycidyl ether, M=202.2 g/mol), cyclohexane dimethanol, or oligo- and poly-propylene glycol. The specific amount of substance n(EP)/m of epoxide groups in these epoxide resins is preferably from 0.4 mol/kg to 7 mol/kg, particularly preferably from 0.6 mol/kg to 6 mol/kg.

Particularly preferred are epoxide resins on the basis of bisphenol A or bisphenol F or mixtures of these.

The amines A are aliphatic linear, cyclic or branched amines having at least one primary or secondary amino group. They have preferably from two to twelve carbon atoms and may also comprise tertiary amino groups, or hydroxyl groups as further functional groups. Particularly preferred are primary monoamines A1 having from six to twelve carbon atoms such as n-hexylamine, cyclohexylamine, 2-ethylhexylamine and stearylamine, primary-tertiary diamines A2 such as dimethylamino propylamine, diethylamino propylamine, and N-(2-aminoethyl) piperidine, di-primary-secondary amines A3 such as diethylenetriamine, triethylenetetramine, and tetraethylenepentamine as well as commercial mixtures of oligomeric diamino polyethylene imines, further preferred are secondary amines and diamines A4 such as piperidine, piperazine, di-n-butylamine, morpholine, and hydroxyl-functional secondary amines A5 such as ethanolamine, diethanolamine, and diisopropanolamine. Mixtures of these amines mentioned here may also be used.

In a preferred embodiment, at least two of the amines are present in the mixture of amines, where the amines preferably belong to different groups.

With particular preference, these amine mixtures comprise at least one amine A2 having a primary and a tertiary amino group, and at least one amine A4 or A5 having a secondary amino group, and in a especially preferred embodiment, at least one amine A2 and at least one amine A5.

The unsaturated fatty acid F' which is optionally used has at least one olefinic unsaturation, and preferably from six to thirty carbon atoms, particularly preferred, from eight to twenty-six carbon atoms, and especially preferred, from sixteen to twenty-two carbon atoms. Among the preferred unsaturated fatty acids are palmitoleic acid, oleic acid, erucic acid, linoleic acid, linolenic acid, eleostearic acid, arachidonic acid, clupanodonic acid, and mixtures of fatty acids made from natural sources such as linseed oil fatty acid, isomerised sunflower fatty acid, tall oil fatty acid, cotton seed oil fatty acid, rape seed oil fatty acid, and fatty acid mixtures obtained from dehydrated castor oil.

The plastified epoxide-amine adducts are made in a stepwise reaction, where in the first step, a fatty acid amide, or a mixture thereof with a diglyceride and/or a monoglyceride is made as described supra. This mixture comprising the fatty acid amide is charged for the second step, and in a preferred embodiment, the following reactants are admixed: an aromatic dihydroxy compound D1 which is preferably selected from bisphenol A (2,2-bis(4-hydroxyphenyl)-propane), bisphenol F (bis(4-hydroxyphenyl)-methane), bisphenol S (4,4'-dihydroxydiphenyl sulphone), and resorcinol, and at least one, preferably two, of the amines A, where it is preferred to choose two amines belonging to a different class of amines A according to the classification supra. An optional ingredient in this reaction is the unsaturated fatty acid F' which may be added to this mixture. This mixture is heated to a temperature of from 60° C. to 120° C. until a clear melt is obtained. An epoxide resin E is then added, preferably in an amount that the ratio of the amount of substance n(EP) of epoxide groups in E to the sum of the amount of substance n(NH) of aminic hydrogen atoms in the amines A and A' and the amount of substance n(NH) of amidic hydrogen atoms in the fatty acid amide M, the amount of substance n(COOH) of acidic hydrogen atoms in the fatty acid F', and the amount of substance n(OH) of primary hydroxyl groups in the hydroxy-functional amines A5 and the amount of substance n(OH) of phenolic hydroxyl groups of the aromatic dihydroxy compound D1 is from 0.8 mol/mol to 0.999 mol/mol.

An aminic hydrogen atom, in the context of this invention, is a hydrogen atom H in a group

where none of $R^1$ and $R^2$ is an acyl group, particularly not a >CO group or a sulphone group $>SO_2$ or a phosphone group $—PO_x$, where x is greater than zero.

Formation of an epoxy amine adduct by ring opening of the epoxy ring is accompanied by a rise in temperature due to the exothermic nature of this reaction, therefore the epoxide resin E is added in portions, and the reaction mixture is allowed to cool in between. The reaction mixture is held at at least 140° C. to allow the reaction to complete, whereafter no free epoxide group remains. The reaction product is then added to an aqueous acid solution to neutralise the product and then diluted to a mass fraction of solids of preferably not more than 50%. The degree of neutralisation, expressed as the amount-of-substance fraction x(salt)=n(salt)/(n(salt)+n(amine)) of ammonium salt formed by reaction with the acid in the sum of the amount of substance n(salt) of ammonium salt and the amount of substance n(amine) of amine, is preferably from 45% to 80%. After heating the neutralised mixture to between 60° C. and 95° C., a further portion of epoxide resin is added. This quantity is preferably chosen such that the amount of substance n(EP) of epoxide groups in the added portion of epoxide resin is from 20% to 50% of the amount of substance of tertiary amino groups. It had been found in the experiments whereupon this invention is based that a lower amount of epoxide resin corresponding to less than 20%, results in a dispersion having too high viscosity, while a higher amount of epoxide resin corresponding to more than 50%, results in an increase in particle size with a propensity to coalescence, and hence, poor storage stability.

The oil length of the binders thus obtained is at least 10%, preferably at least 15%, and particularly preferred, 18% or more.

The binder dispersion thus obtained is preferably used as primer for base metals, and is formulated by adding to the dispersion the usual additives such as additional emulsifiers, defoamers, thixotropy agents, thickeners, fillers and pigments. The use of iron oxide pigments, preferably in combination with zinc phosphate as active filler, and also kaolin and talc is recommended. Addition of crosslinkers and/or heating the coated substrates is not needed with primers prepared in this way. Addition of siccatives which may be the broadly used cobalt-based siccatives, or the environmentally compatible iron-based siccatives further enhances the hardness development upon exposure to ambient air. In comparison to primers prepared according to EP 1 233 034 B1, the corrosion protection as measured in the salt spray test is markedly improved. The substrate are preferably wood, fabricated wood, concrete, plaster, glass, ceramics, and metals. The primer is usually applied by spraying, dipping, rolling, or brushing. In the case of metal as a substrate, the preferred application method is electrophoretic deposition.

Physical and Physicochemical Quantities Used

The iodine value, also referred to as "iodine number", is defined according to DIN 53 241-1 as the ratio of the mass of iodine $m_I$ which is added under discolouration to the olefinic double bonds of a sample, and the mass $m_B$ of that sample (mass of solids in the sample for solutions or dispersions); the customary unit is "g/(100 g)", equivalent to "g/hg" or "dag/kg" or with preference, "cg/g".

The acid value, or acid number, is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The saponification value, or saponification number, is defined, according to DIN EN ISO 3657-2013, as the ratio of that mass $m_{KOH}$ of potassium hydroxide which is needed to saponify the sample of fat or oil under examination, and the mass $m_B$ of this sample, or the mass of the solids in the sample in the case of a solution or dispersion; its customary unit is "mg/g".

The amine number is defined, according to DIN 53 176, as the ratio of that mass $m_{KOH}$ of potassium hydroxide that consumes the same amount of acid for neutralisation as the sample under consideration, and the mass $m_B$ of that sample, or the mass of solid matter in the sample in the case of solutions or dispersions, the commonly used unit is "mg/g".

The dynamic viscosity η is measured at 23° C. in a cone-and-plate viscometer at a shear rate of 100 s$^{-1}$.

The pendulum hardness was measured according to the König method following DIN EN ISO 1522.

The oil length of the binder is the mass fraction of saturated or unsaturated fatty acids in the binder resins.

The specific content of epoxide groups is defined as the ratio of the amount of substance n(EP) of epoxide groups EP in a sample B of mass $m_B$, to that mass $m_B$, or the mass of the solids in the sample in the case of a solution or dispersion; with the SI unit of "mol/kg", or "mmol/g". It is the reciprocal of the so-called "epoxy equivalent" usually measured in "g/mol" which states the ratio of the mass $m_B$ of a sample to the amount of substance n(EP) of epoxide groups present in that sample.

EXAMPLES

The following abbreviations are used in the examples:

DOLA=diethanolamine, molar mass 105.14 g/mol

DEAPA=diethylamino propylamine, molar mass 130.24 g/mol

DMAPA=dimethylamino propylamine, molar mass 102.18 g/mol

HMDA=hexamethylene diamine, 1,6-diamino hexane, molar mass 116.2 g/mol

BHMTA=bis(hexamethylene) triamine, 6,6'-iminodihexylamine, molar mass 215.38 g/mol TOFA=tall oil fatty acid, acid value 194 mg/g (calculated molar mass 289.2 g/mol)

OA=oleic acid, molar mass 282.47 g/mol

LO=linseed oil; saponification value 190 mg/g, acid value less than 0.5 mg/g (calculated molar mass 885.9 g/mol)

LOFA=linseed oil fatty acid, acid value 200 mg/g (calculated molar mass 280.55 g/mol)

RIFA=ricinenic acid, 9,11-octadecadienoic acid, molar mass 280 g/mol

RO=dehydrated castor oil, acid value 3 mg/g, saponification value 190 mg/g, calculated molar mass 872.18 g/mol BA=Bisphenol A, molar mass 228.29 g/mol CE=®Cardura E, glycidyl ester of ®Versatic acid, molar mass 228.33 g/mol EP 1=diepoxide resin based on Bisphenol A, specific amount of epoxide groups 2.08 mol/kg EP 2=diepoxide resin based on Bisphenol A, specific amount of epoxide groups 5.26 mol/kg (="EP 380", molar mass divided by the number of epoxide groups per molecule: 190 g/mol)

HOAc=acetic acid, molar mass 60.05 g/mol, undiluted

LA=lactic acid, molar mass 90.08 g/mol

Synthesis of Amine-Functional Fatty Acid Amides

Example 1—Fatty Acid Amide Mixture FA 1

146 g (1 mol) of triethylene tetramine and 1760 g (approx. 2 mol) of linseed oil were charged into a 3 L three-necked vessel equipped with a thermocouple, a stirrer and a reflux condenser, and heated to 95° C. under stirring. This temperature was held for approximately six hours until at least 95% of the primary amino groups had reacted, as monitored by the decrease in the amine number measured, starting from 117 mg/g. Approximately 1900 g of a mixture of the amide and glycerides was obtained, which mixture had an amine number of 61 mg/g.

Example 2—Fatty Acid Amide Mixture FA 2

146 g (1 mol) of triethylene tetramine and 1760 g (approx. 2 mol) of dehydrated castor oil were charged into a 3 L three-necked vessel equipped with a thermocouple, a stirrer and a reflux condenser, and heated to 95° C. under stirring. This temperature was held for approximately six hours until at least 95% of the primary amino groups had reacted, as monitored by the decrease in the amine number measured, starting from 117 mg/g. Approximately 1900 g of a mixture of the amide and glycerides was obtained, which mixture had an amine number of 60 mg/g.

Example 3—Fatty Acid Amide Mixture FA 3

146 g (1 mot) of triethylene tetramine and 1320 g (1.5 mol) of linseed oil were charged into a 3 L three-necked vessel equipped with a thermocouple, a stirrer and a reflux condenser, and heated to 95° C. under stirring. This temperature was held for approximately six hours until at least 95% of the primary amino groups had reacted, as monitored by the decrease in the amine number measured, starting from 153 mg/g. Approximately 1460 g of a mixture of the amide and glycerides was obtained, which mixture had an amine number of 79 mg/g.

Example 4—Fatty Acid Amide Mixture FA 4

146 g (1 mol) of triethylene tetramine and 880 g (1.0 mol) of linseed oil were charged into a 3 L three-necked vessel equipped with a thermocouple, a stirrer and a reflux condenser, and heated to 95° C. under stirring. This temperature was held for approximately seven hours until at least 95% of the primary amino groups had reacted, as monitored by the decrease in the amine number measured, starting from 218 mg/g. Approximately 1020 g of a mixture of the amide and glycerides was obtained, which mixture had an amine number of 114 mg/g.

Example 5—Fatty Acid Amide FA 5

215.4 g (1 mol) of bis-hexamethylene triamine were heated to 40° C. under stirring. 560 g (2.0 mol) of tall oil fatty acid were added over fifteen minutes under continued stirring, and then heated after the end of addition taking advantage of the neutralisation reaction exothermy within one hour to 150° C. Water formed in the reaction (about 36 g) was separated during three further hours of reaction at 150° C., whereafter the reaction mixture was steadily heated during two hours to 180° C. This temperature was held until an amine number of 76 mg/g was measured, which corresponds to 1 mol of secondary amino groups. 730 g of a brownish amide mixture which was highly viscous at room temperature (23° C.) were obtained. This amide mixture had an amine number of 75 mg/g, and an acid number of 8 mg/g.

Example 6—Fatty Acid Amide Mixture FA 6

215.4 g (1.0 mol) of BHMTA and 1771.8 g (2.0 mol) of LO were charged into a 3 L three-necked vessel equipped with a thermocouple, a stirrer and a reflux condenser, and heated to 95° C. under stirring. This temperature was held for approximately six hours until at least 95% of the primary amino groups had reacted, as monitored by the decrease in the amine number measured, starting from 85 mg/g.

Approximately 1950 g of a mixture of the amide and glycerides was obtained which mixture had an amine number of 30 mg/g.

Example 7—Fatty Acid Amide Mixture FA 7

116.2 g (1.0 mol) of HMDA and 1771.8 g (2.0 mol) of LO were charged into a 3 L three-necked vessel equipped with a thermocouple, a stirrer and a reflux condenser, and heated to 95° C. under stirring. This temperature was held for approximately seven hours until at least 95% of the primary amino groups had reacted, as monitored by the decrease in the amine number measured, starting from 60 mg/g. Approximately 1870 g of a mixture of the amide and glycerides was obtained, which mixture had an amine number of 3 mg/g.

Preparation of Plastified Epoxide-Amine Adduct Dispersions

Example 8—Plastified Dispersion of an Epoxide-Amine Adduct 1906 g (1.0 mol) of the amine-functional fatty acid amide/glyceride mixture FA 1 and 561 g (2.0 mol) of LOFA were charged into a three-necked vessel equipped with a stirrer and a reflux condenser and heated to 80° C. Under stirring, and in this sequence, 960 g (4.2 mol) of BA, 210 g (2.0 mol) of DOLA, and 184 g (1.8 mol) of DMAPA were added. After one hour, when the reaction mixture was a homogeneous melt, 4530 g (11.9 mol) of the diepoxide resin EP2 were added over ninety minutes while the temperature rose due to exothermy up to 160° C. The reaction mixture was held at 160° C. for one further hour until no more free epoxide groups could be detected. A dilution vessel was prepared into which 9 kg of deionised water and 677 g of an aqueous lactic acid solution were charged, which solution had a mass fraction of 50% of lactic acid (LA). The resin from the reaction vessel was added to this dilution vessel under stirring within thirty minutes. The temperature of the mixture was adjusted to 70° C., and the mixture was then stirred at this temperature to homogenise for one hour. By sequential addition of portions of water, the mixture was further diluted to a mass fraction of solids of 43%. The aqueous dispersion thus obtained was then heated to 80° C. whereupon a second portion of 400 g (1.05 mol) of diepoxide resin EP2 was added, and the resulting mixture was stirred for two further hours at 80° C. By addition of further water, and under cooling to room temperature (23° C.), the mixture was diluted to a mass fraction of solids of 40%. The aqueous dispersion 6a thus obtained had a pH of 4.0, an oil length of 24%, a dynamic viscosity, measured at 25° C. and a shear gradient of 100 s$^{-1}$, of 290 mPa·s, and a Staudinger-Index, measured at 25° C. and in N-ethyl pyrrolidone as solvent, of 58 cm$^3$/g.

Further amine-plastified epoxide-amine adduct dispersions 6b to 6f were prepared in a similar process using the following ingredients:

TABLE 1

Preparation of Plastified Dispersions of Epoxide-Amine Adducts (Mass of Components where the Table Entries are in g)

| | Example | | | | |
|---|---|---|---|---|---|
| | 6b | 6c | 6d | 6 | 6f |
| Fatty Acid Amide/ Glyceride Mixture | FA2; 1906 g | FA3; 1466 g | FA4; 1026 g | FA1; 1906 g | FA1; 1906 g |
| Fatty Acid | Linseed Oil FA; 560 g | Ricinenic acid; 560 g | Linseed Oil FA; 560 g | None | none |
| Bisphenol A | 960 g | 960 g | 960 g | 960 g | 960 g |
| Diethanolamine | 210 g | 210 g | 105 g | 210 g | 210 g |
| Diamine | DMAPA; 184 g | DEAPA; 234 g | DMAPA; 184 g | DMAPA; 184 g | DMAPA; 184 g |
| Epoxide Resin EP2 | 4104 g | 3876 g | 3724 g | 3880 g | 3880 g |
| Neutralisation | HOAc; 210 g | LA; 594 g | LA; 520 g | LA; 450 g | LA; 380 g |
| Epoxide Resin EP2 | 400 g | 400 g | 400 g | 400 g | none |
| Resin Yield | 8324 g | 7706 g | 6959 g | 7540 g | 7140 g |
| Oil Length in % | 26 | 23 | 19 | 21 | 22 |
| Staudinger Index in cm$^3$/g | 61 | 57 | 63 | 69 | 18 |
| ω (solids) in % | 42 | 40 | 42 | 44 | 39 |
| η (23° C., 100 s$^{-1}$) in mPa · s | 366 | 188 | 275 | 330 | 355 |

ω mass fraction of solids

η dynamic viscosity

Comparative Example 7—Intrinsically Plastified Epoxide-Amine Adduct Dispersion According to EP 1 233 034 B1

106 g (1.0 mol) of diethylene triamine and 560 g (2.0 mol) of tall oil fatty acid were charged into a three-necked reaction vessel equipped with stirrer and reflux condenser and heated, taking advantage of the heat of neutralisation, to 80° C. Under stirring, 750 g (3.0 mol) of CE (glycidyl neodecanoate, Cardura® E, Momentive Specialty Chemicals) were added under external cooling within one hour, keeping the temperature below 90° C. The temperature was held for one further hour after the addition was completed. Next, the following components were added under stirring, in sequence: 912 g (4.0 mol) of bisphenol A, 210 g (2.0 mol) of diethanolamine and 184 g (1.8 mol) of dimethylamino propylamine, whereafter the resulting mixture was stirred for one hour at 80° C. until a clear solution had formed. Within ninety minutes, at 80° C., 3600 g (9.5 mol) of diepoxide resin EP 2 were added at constant rate while keeping the temperature of the reaction mixture by cooling to compensate for the exothermic reaction below 160° C. This temperature was held after complete addition for one further hour until all epoxide groups had been consumed. A dilution vessel was prepared and charged with 8 kg of water and 420 g of an aqueous lactic acid solution having a mass fraction of 50% of lactic acid in the aqueous solution thereof, whereto the resin formed was added under stirring during thirty minutes. The temperature of the resulting mixture was then adjusted to 70° C., and the mixture was homogenised during one hour at that temperature.

By addition of further portions of water, the mass fraction of solids was adjusted to 43% from a calculated value of 44.4%. The aqueous resin dispersion thus obtained was heated to 80° C. whereafter a second portion of 400 g (1.05 mol) of diepoxide resin EP 2 was added, and the mixture was kept under stirring for two more hours. The mass fraction of solids was adjusted after cooling to room temperature to 40%, yielding a dispersion having a pH of 4.3, a dynamic viscosity (measured at 23° C. and a shear rate of 100 s$^{-1}$), of 265 mPa·s, and a Staudinger-Index measured in N-methylpyrrolidone at 23° C. of 61 cm$^3$/g.

Comparative Example 8

Corresponds to Comparative Example 7, but Using Oleic Acid Instead of Tall Oil Fatty Acid 106 g (1.0 mol) of diethylene triamine and 564.94 g (2.0 mol) of oleic acid were charged into a three-necked reaction vessel equipped with stirrer and reflux condenser and heated, taking advantage of the heat of neutralisation, to 80° C. Under stirring, 750 g (3.0 mol) of CE (glycidyl neodecanoate, Cardura® E, Momentive Specialty Chemicals) were added under external cooling within one hour, keeping the temperature below 90° C. The temperature was held for one further hour after the addition was completed. Next, the following components were added under stirring, in sequence: 912 g (4.0 mol) of bisphenol A, 210 g (2.0 mol) of diethanolamine and 184 g (1.8 mol) of dimethylamino propylamine, whereafter the resulting mixture was stirred for one hour at 80° C. until a clear solution had formed. Within ninety minutes, at 80° C., 3600 g (9.5 mol) of diepoxide resin EP 2 were added at constant rate while keeping the temperature of the reaction mixture by cooling to compensate for the exothermic reaction below 160° C. This temperature was held after complete addition for one further hour until all epoxide groups had been consumed.

A dilution vessel was prepared and charged with 8 kg of water and 420 g of an aqueous lactic acid solution having 50% strength, whereto the resin formed was added under stirring during thirty minutes. The temperature of the resulting mixture was then adjusted to 70° C., and the mixture was homogenised during one hour at that temperature.

The aqueous resin dispersion thus obtained was heated to 80° C. whereafter a second portion of 400 g (1.05 mol) of diepoxide resin EP 2 was added, and the mixture was kept under stirring for two more hours. The mass fraction of solids was adjusted after cooling to room temperature to 41%, yielding a dispersion having a pH of 4.3, a dynamic viscosity (measured at 23° C. and a shear rate of 100 s$^{-1}$), of 340 mPa·s, and a Staudinger-Index measured in N-methyl pyrrolidone at 23° C., of 59 cm$^3$/g.

Example 9—Primer Preparation and Test

Primers 9a through 9f were prepared from the binder dispersions 6a through 6f, and primers 9g and 9h were prepared from the binders of comparative examples 7 and 8, according to the following recipe:

A mixture was prepared from 88 g of deionised water, 22 g of a commercial polymeric non-ionic dispersing agent (®Additol VXW 6208, Allnex Austria GmbH) and 3 g of a commercial self-emulsifiable defoamer based on acetylene diol chemistry (®Surfynol SE-F, Air Products & Chemicals) with addition of 6 g of a thixotropy agent which is an amide-modified castor oil derivative (®Luwotix HT, Lehmann & Voss) and 3 g of an acrylate thickener (®Acrysol RM 8/12 WA, Dow Chemical), Using this mixture, a suspension was prepared therein from 62 g of an iron oxide pigment (®Bayferrox 140, Lanxess AG), 106 g of an organic modified basic zinc orthophosphate hydrate (®Heucophos ZPO, Heubach GmbH), 55 g of a standard brightness pulverised kaolin (®ASP 600, BASF SE) and 55 g of a pulverised talc having a median particle size of 4 µm (micro-talc AT1, Norwegian Talc). 480 g of the binder dispersion and 1.2 g of an iron-based siccative solution in 1,2-propylene glycol (®Borchi Oxy-Coat, OMG Borchers GmbH, the solution having a mass fraction of iron of 900 mg/kg) and further 118.8 g of deionised water were added to this suspension. The primer thus prepared had an efflux time (4 mm cup; DIN-EN-ISO 2431 or DIN 53 211) of 30 s.

The primers were sprayed onto untreated iron panels to obtain an even layer with a dry film thickness of 30 µm. After drying at room temperature (23° C.) for ten days, a corrosion test was made in accordance with DIN 50 021. The following data have been found (values are creep distance from a scratch in mm):

TABLE 2

Corrosion Test Results

| | exposure time | | | |
|---|---|---|---|---|
| Primer | 250 h | 500 h | 750 h | 1000 h |
| 9a | <1 mm | <1 mm | <1 mm | 1 mm |
| 9b | <1 mm | <1 mm | 1 mm | 1 mm to 2 mm |
| 9c | <1 mm | <1 mm | <1 mm | 1 mm |
| 9d | <1 mm | <1 mm | 1 mm | 1 mm to 2 mm |
| 9e | <1 mm | <1 mm | <1 mm | 1 mm |
| 9f | <1 mm | <1 mm | <1 mm | 1 mm |

TABLE 2-continued

Corrosion Test Results

| Primer | exposure time | | | |
|---|---|---|---|---|
| | 250 h | 500 h | 750 h | 1000 h |
| 9g | <1 mm | <1 mm | 2 mm | >10 mm |
| 9h | <1 mm | <1 mm | 1 mm to 2 mm | 5 mm |

Example 10—Drying Behaviour

The binder dispersions made in examples 6a through 6f were formulated to siccativised clear coating compositions 10 a through f, 10 g from comparative binder of example 7, and 10 h from comparative binder of example 8, by adding the iron-containing siccative Borchi Oxy-Coat in amount that there is a mass ratio m(Fe)/m(B) of 6 mg/kg, where m(Fe) is the mass of iron in the siccative, and m(B) is the mass of the (solid, i. e. undiluted) binder, and by adjusting to a mass fraction of binder solids of 38% in each case by addition of water.

The resulting clear coating compositions were applied to glass plates using a film-drawing cube to obtain films having 200 μm wet film thickness (corresponding, in this case, to 76 μm dry film thickness). Pendulum hardness according to the König method was determined according to DIN EN ISO 1522. The following results were obtained (with | without added siccative) after drying at room temperature (23° C.):

TABLE 3

Hardness Development

| Clear Coating | König Hardness after | | |
|---|---|---|---|
| Composition | 24 h | 7 days | 14 days |
| 10a | 35 s|24 s | 96 s|29 s | 114 s|48 s |
| 10b | 54 s|49 s | 108 s|66 s | 132 s|80 s |
| 10c | 64 s|48 s | 104 s|58 s | 122 s|66 s |
| 10d | 72 s|66 s | 88 s|69 s | 101 s|75 s |
| 10 | 87 s|54 s | 120 s|60 s | 150 s|81 s |
| 10f | 78 s|40 s | 116 s|46 s | 140 s|62 s |
| 10g | 59 s|57 s | 67 s|61 s | 82 s|73 s |
| 10h | 51 s|54 s | 59 s|58 s | 58 s|60 s |

The invention claimed is:

1. A binder resin for air drying paints which is a plastified epoxide-amine adduct P comprising an adduct EA of epoxide resins E and amines A, wherein the adduct P is plastified by incorporation of a mixture M' of a fatty acid amide M with a glyceride mixture GX, wherein the glyceride mixture GX is a mixture of at least two of a triglyceride GT, a diglyceride GD, and a monoglyceride GM, wherein the mixture M is made by reaction of an oil GT and an amine A', wherein the oil GT is a triglyceride that is an ester of one molecule of glycerol and three molecules of a fatty acid F, wherein
in in one molecule of the triglyceride, the fatty acids F are the same, or are different from each other, or
the triglyceride is a mixture of triglycerides,
wherein the amine A' has at least two primary amino groups and at least one secondary amino group, and wherein the fatty acid amide M comprises moieties derived from the fatty acid F and from the amine A'.

2. The plastified epoxide-amine adduct P of claim 1, wherein the epoxide resins E have an average of at least two epoxide groups per molecule.

3. The plastified epoxide-amine adduct P of claim 1, wherein the amines A are aliphatic linear, cyclic or branched amines having at least one primary or secondary amino group.

4. The plastified epoxide-amine adduct P of claim 1, wherein the adduct EA of epoxide resins E and amines A is an adduct EA of epoxide resins E, amines A, and unsaturated fatty acids F'.

5. The plastified epoxide-amine adduct P of claim 1, wherein the fatty acid F is selected from the group consisting of saturated fatty acids having from four to thirty carbon atoms and from unsaturated fatty acids having from twelve to thirty carbon atoms and at least one olefinic unsaturation.

6. The plastified epoxide-amine adduct P of claim 1, wherein the amine A' is selected from the group consisting of linear, branched or cyclic aliphatic amines having at least two primary amino groups and at least one secondary amino group and from four to forty carbon atoms.

7. The plastified epoxide-amine adduct P of claim 1, wherein the amine A' obeys to the formula

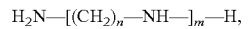

$H_2N\text{—}[(CH_2)_n\text{—}NH\text{—}]_m\text{—}H$, where n is an integer number of from two to twelve, and m is an integer number of from two to two hundred.

8. The plastified epoxide-amine adduct P of claim 1, wherein the amines A are selected from the group consisting of primary monoamines A1 having from six to twelve carbon atoms, primary-tertiary diamines A2, di-primary-secondary amines A3, secondary amines and diamines A4, hydroxy-functional secondary amines A5, and mixtures thereof.

9. The plastified epoxide-amine adduct P of claim 8,
wherein the primary monoamines A1 having from six to twelve carbon atoms, are selected from the group consisting of n-hexylamine, cyclo-hexylamine, 2-ethylhexylamine and stearylamine,
wherein the primary-tertiary diamines A2 are selected from the group consisting of dimethylamino propylamine, diethylamino propyl amine, and N-(2-aminoethyl) piperidine,
wherein the di-primary-secondary amines A3 are selected from the group consisting of diethylenetriamine, triethylene-tetramine, and tetra-ethylenepentamine, and commercial mixtures of oligomeric diamino polyethylene imines,
wherein the secondary amines and diamines A4 are selected from the group consisting of piperidine, piperazine, di-n-butylamine, morpholine, and
wherein the hydroxyl-functional secondary amines A5 are selected from the group consisting of ethanolamine, diethanolamine, and diisopropanolamine.

10. The plastified epoxide-amine adduct P of claim 1, wherein the epoxide resins E are selected from the group consisting of diepoxide or polyepoxide compounds having two or more than two epoxide groups per molecule, which are reaction products of epichlorohydrin with aromatic compounds D1 having two or more hydroxyl groups per molecule, or with (cyclo)aliphatic compounds D2 having each two or more hydroxyl groups per molecule, or reaction products of low molar mass diepoxide or polyepoxide compounds D3 with the aromatic compounds D1 or the (cyclo)aliphatic compounds D2.

11. The plastified epoxide-amine adduct P of claim 10, wherein the aromatic compounds D1 having two or more hydroxyl groups per molecule are selected from the group consisting of bisphenol A, bisphenol F, dihydroxydiphenyl sulphone, hydroquinone, resorcinol, and 1,4-bis-[2-(4-hydroxyphenyl)-2-propyl]benzene, and wherein the (cyclo)aliphatic compounds D2 having each two or more hydroxyl groups per molecule, are selected from the group consisting of hexanediol-1,6, butanediol-1,4, cyclohexane dimethanol, and oligo- and polypropylene glycol.

12. A primer comprising the plastified epoxide-amine adduct P of claim 1 and at least one of emulsifiers, defoamers, thixotropy agents, thickeners, fillers, pigments, or siccatives selected from the group consisting of cobalt-based siccatives and iron-based siccatives.

13. A method comprising coating the primer of claim 12 onto a substrate which is selected from the group consisting of wood, fabricated wood, concrete, plaster, glass, ceramics, and metals by applying the primer by spraying, dipping, rolling, or brushing.

14. A method comprising coating the primer of claim 12 onto a metallic substrate by applying the primer by electrophoretic deposition.

15. The plastified epoxide-amine adduct P of claim 1, wherein the fatty acid F is selected from the group consisting of butyric acid, caproic acid, caprylic acid, 2-ethyl hexanoic acid, capric acid, lauric acid, myristic acid, palmitic acid, stearic acid, arachidic acid, behenic acid, lignoceric acid, cerotic acid, montanic acid, and melissic acid.

16. The plastified epoxide-amine adduct P of claim 1, wherein the fatty acid F is selected from the group consisting of myristoleic acid, palmitoleic acid, petroselinic acid, petroselaidic acid, oleic acid, elaidic acid, linoleic acid, linolelaidic acid, linolenic acid, linolenelaidic acid, alpha- and beta-eleostearic acids, gadoleic acid, arachidonic acid, erucic acid, brassidic acid, and clupanodonic acid.

17. The plastified epoxide-amine adduct P of claim 1, wherein the amine A' is selected from the group consisting of diethylene triamine, triethylene tetramine, tetraethylene pentamine, pentaethylene hexamine, oligomeric and polymeric ethylene imines having amino end groups, of formula

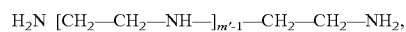

where m' is from five to two hundred, di-(2-methylethylene) triamine, tri-(2-methylethylene) tetramine, tetra-(2-methylethylene) pentamine, dipropylene triamine, tripropylene tetramine, tetrapropylene pentamine, dibutylene tri-amine, tributylene tetramine, tetrabutylene pentamine, di(hexamethylene) triamine, tri-(hexamethylene) tetramine, tetra(hexamethylene) pentamine, N,N'-bis-(2-aminoethyl)-piperazine, and N'-[2-[4-(2-aminoethyl) piperazin-1-yl]-ethyl]-ethane-1,2-diamine.

* * * * *